(12) United States Patent
Schmidt (10) Patent No.: US 7,844,890 B2
(45) Date of Patent: Nov. 30, 2010

(54) DOCUMENT LINK MANAGEMENT (75) Inventor: Olaf Schmidt, Walldorf (DE)

(73) Assignee: SAP AG, Walldorf (DE)

( * ) Notice: Subject to any disclaimer, the term of this patent is extended or adjusted under 35 U.S.C. 154(b) by 968 days.

(21) Appl. No.: 11/618,630

(22) Filed: Dec. 29, 2006

(65) Prior Publication Data
US 2008/0172595 A1 Jul. 17, 2008

(51) Int. Cl.
*G06F 17/30* (2006.01)
(52) U.S. Cl. .................... 715/206; 715/205; 715/208
(58) Field of Classification Search ............... 715/200, 715/205, 206, 208, 254, 255
See application file for complete search history.

(56) References Cited

U.S. PATENT DOCUMENTS

| | | | | |
|---|---|---|---|---|
| 7,073,129 | B1 * | 7/2006 | Robarts et al. | 715/740 |
| 7,395,507 | B2 * | 7/2008 | Robarts et al. | 715/744 |
| 7,603,360 | B2 * | 10/2009 | Ramer et al. | 707/10 |
| 7,613,687 | B2 * | 11/2009 | Nye | 707/3 |
| 2005/0086216 | A1 * | 4/2005 | Davis | 707/3 |
| 2005/0120006 | A1 * | 6/2005 | Nye | 707/3 |
| 2006/0167857 | A1 * | 7/2006 | Kraft et al. | 707/3 |
| 2007/0255704 | A1 * | 11/2007 | Baek et al. | 707/6 |
| 2007/0282598 | A1 * | 12/2007 | Waelti et al. | 704/10 |
| 2008/0215313 | A1 * | 9/2008 | Waelti et al. | 704/10 |

OTHER PUBLICATIONS

"Internet Explorer: The Features," Windows, [online] <http://www.microsoft.com/windows/products/winfamily/ie/features.mspx>, retrieved Jun. 12, 2007, 3 pages.
"Firefox 2 Features," [online] <http://www.mozilla.com/en-US/firefox/features.html>, retrieved Jun. 1, 2007, 5 pages.
"Internet Explorer 6: Use Favorites to Get Around the Web," [online] <http://www.microsoft.com/windows/ie/ie6/using/howto/share/favorites.mspx>, Mar. 26, 2003, retrieved Jun. 1, 2007, 4 pages.

* cited by examiner

*Primary Examiner*—Stephen S Hong
*Assistant Examiner*—Gregory J Vaughn
(74) *Attorney, Agent, or Firm*—Fish & Richardson P.C.

(57) ABSTRACT

Document links may be efficiently managed by providing automated techniques for organizing them. In particular implementations, a system and process for automated management of document links may include the ability to determine that a link is to be established for a document and identify at least one descriptor for the document. The system and process may also include the ability to correlate the identified document descriptor(s) with at least one document descriptors in a pre-existing taxonomy of document descriptors and associate the correlated taxonomy document descriptor(s) with a link for the document.

22 Claims, 4 Drawing Sheets

DOCUMENT LINK MANAGEMENT

BACKGROUND

With the continued growth of communication networks, users are continuing to access more data than ever. Additionally, with the continued increase of computer memory capabilities, users are continuing to store more data than ever. Unfortunately, as users access and/or save more data, it is easier for them to become confused as to where data in which they are interested is located, whether on a network or on their own computer.

One common approach to solving this problem has been to establish a list of bookmarks, or favorites, that link a user to data in which they are particularly interested. These types of aids are commonly used in Web browsers such as Microsoft's Internet Explorer. With the continued expansion of communication networks and computer storage, however, even a set of bookmarks can become unwieldy for a user. Thus, Web browsers often allow a user to establish a directory structure for the bookmarks. When a user creates a new bookmark, he determines where to insert it in the directory structure.

SUMMARY

Links to documents may be managed efficiently by providing automated techniques for organizing and retrieving the links. The links may also be reorganized and combined by automated techniques, which may provide for continuing usefulness of document link collections.

In one general aspect, a process for managing document links may include determining that a link is to be established for a document and identifying at least one descriptor for the document. Determining that a link is to be established for a document may, for example, include detecting a command indicating that a link is to be established for a document currently being visually presented. Identifying at least one descriptor for the document may, for example, include analyzing document meta-data and/or document contents. The process may also include correlating the identified document descriptor with at least one document descriptor in a pre-existing taxonomy of document descriptors and associating the correlated taxonomy document descriptor with a link for the document. A document link may, for example, include a Uniform Resource Locator. The process may be implemented by a computer, a machine, a set of instructions on a machine-readable medium, or other appropriate system.

Correlating the identified document descriptor with at least one document descriptor in a pre-existing document descriptor taxonomy may, for example, include comparing the identified document descriptor with the document descriptors in the taxonomy. Correlating the identified document descriptor with at least one document descriptor in a pre-existing document descriptor taxonomy may also include comparing the identified document descriptor against a thesaurus for the taxonomy document descriptors.

Associating the correlated taxonomy document descriptor with a link for the document may, for example, include storing a pointer to the document descriptor in a table of document links. Associating the correlated taxonomy document descriptor with a link for the document may also include generating a visual presentation that inquires which of several correlated taxonomy document descriptors to associate with a document link and detecting a command indicating which correlated taxonomy document descriptors to associate with the document link.

In some implementations, a set of document links organized according to the document descriptor taxonomy may be reorganized so that the document links are organized according to a second document descriptor taxonomy.

Certain implementations may include determining that a document link is to be found, determining at least one document descriptor associated with a document link, and finding a document link based on the determined document descriptor. Determining at least one document descriptor associated with a document link may, for example, include identifying at least one document descriptor for a currently presented document. Determining at least one document descriptor associated with a document link may also include detecting a command that identifies at least one document descriptor. Determining at least one document descriptor associated with the document link may further include generating a visual representation of the document descriptor taxonomy and detecting a command regarding at least one category in the taxonomy.

Finding a document link based on the determined document descriptor may, for example, include searching an association of taxonomy document descriptors and document links based on the determined document descriptor.

Various implementations may include one or more features. For example, document links may be classified in at least a semi-automatic manner according to a taxonomy of document descriptors. This may result in a well-structured document link collection even when document links are amassed over a long time period (e.g., years). The imposed structure may result in making document links easier to find and, hence, use. As another example, document links may be classified based on the content of the associated documents. Thus, the categories into which the document links are placed may reflect the information content of the documents, again making the document links easier to find and, hence, use. As a further example, document links may be retrieved in at least a semi-automatic manner, which allows for efficient and reliable lookup of document links in a collection. As an additional example, a document link collection may be reorganized in an at least semi-automatic manner according to a another taxonomy or combined in an at least semi-automatic manner with a document link collection that is organized according to another taxonomy. This may provide for the continued use of a document link collection over extended periods of time and allow a user to migrate between different platforms. Moreover, this may prove useful in distributed environments so that different document link collections may be combined or shared.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Links to documents may be managed efficiently by providing automated techniques for organizing and retrieving the links. In particular implementations, an automated system and process for managing links may associate one or more document descriptors in a pre-defined taxonomy with a document link. The taxonomy descriptors may then be used to readily find the document link at a later time.

Figure 1:
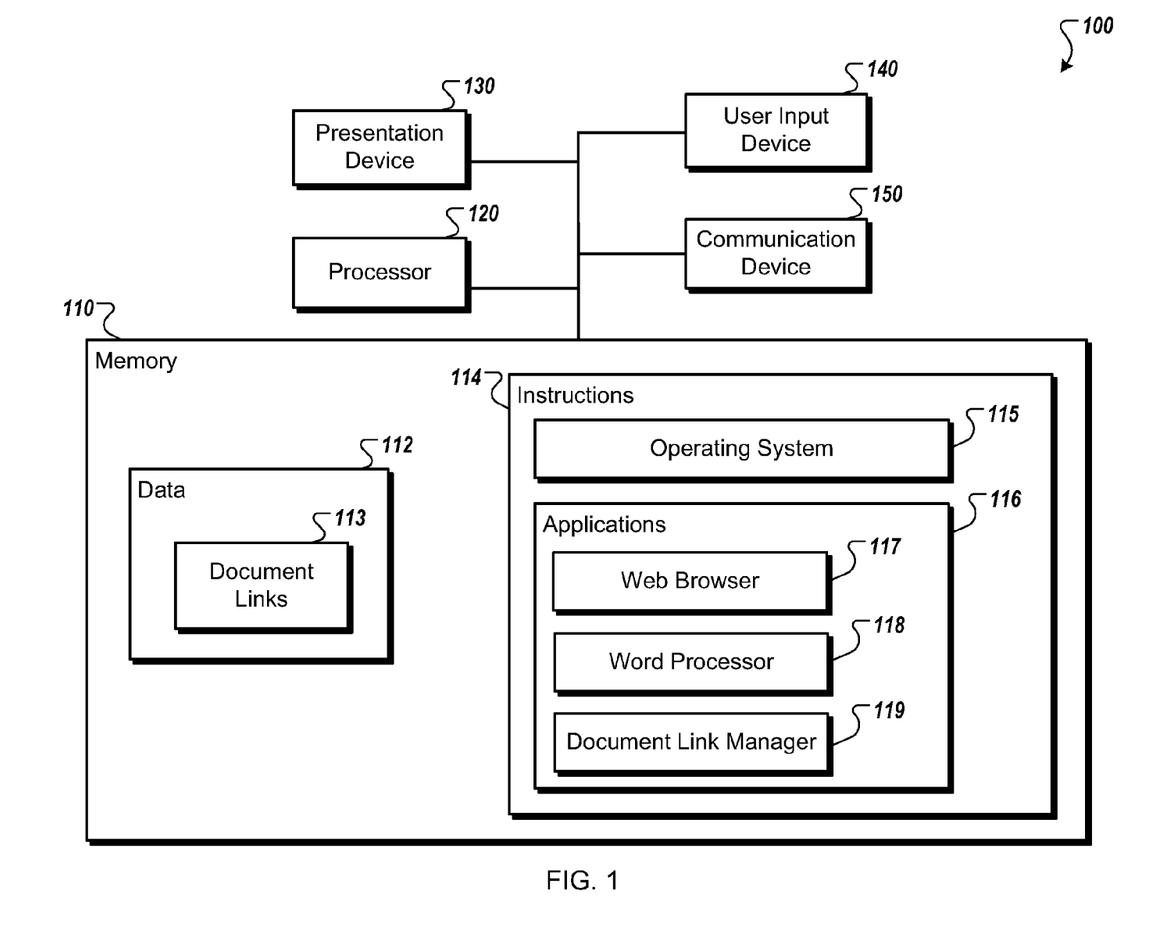
FIG. 1 is a block diagram illustrating one example of a system for managing document links.

FIG. 1 illustrates one implementation of a system 100 for managing document links. System 100 may, for example, represent a personal computer (PC), a workstation, a personal digital assistant (PDA), or any other appropriate automated user interface device.

System 100 includes memory 110, a processor 120, and a presentation device 130. Memory 110, which may be composed of one or more types of memory (e.g., RAM, ROM, CD-ROM, and electromagnetic disk), stores data 112 and instructions 114.

Data 112 may include any appropriate information for allowing system 100 to operate and specifically includes document links 113 in this example. Document links 113 typically specify, or are associate with, paths to documents that have been designated to be of interest. Documents may, for example, be Web pages, word processing documents, spreadsheets, or any other appropriate collections of information. The paths in document links 113 may be of any appropriate format, such as on networks (e.g., Uniform Resource Locators (URLs)) or on computers (e.g., directory paths). A path may even point to a particular portion of a document. Any other appropriate document management system may also be used.

Instructions 114 include collections of logical statements (e.g., software) for, at least in part, making system 100 operate. Instructions 114 include an operating system 115 (e.g., Windows, Unix, or Linux) and applications 116. As illustrated, applications 116 include a Web browser 117, a word processor 118, and a document link manager 119, but it should be understood that applications 116 may include any number and/or type of applications.

Processor 120, which may, for example, have a RISC or CISC architecture, operates, at least in part, according to instructions 114. As part of its operations, processor 120 may prepare data for presentation of presentation device 130. If presentation device 130 has a visual capability, for example, processor 120 may generate visual data (e.g., in the form of a text-based or graphical user interface) for display by presentation device 130.

System 100 also includes a user input device 140 and a communication device 150. User input device 140 may be any appropriate device for receiving input from a user (e.g., a keyboard and/or pointing device). Communication interface 150 may be any appropriate device for sending data from and receiving data for system 100 (e.g., a modem, a network interface card, or a wireless transceiver).

In one mode of operation, when presentation device 130 is displaying a document (in Web browser 117 or word processor 118, for example), processor 120 may detect a request to establish a link to the document. The request may, for example, be in the form of a command received through user input device 140. The document link may specify a document that is local to system 100 (e.g., stored in data 112) or that is remote from system 100 (e.g., that is accessible through communication device 150).

Upon detecting the request, processor 120 may identify one or more descriptors for the document. Identifying the descriptor(s) for the document may, for example, include analyzing document meta-data, which often includes generic descriptions of document contents. Web pages, for example, often have metatags embedded within them to allow users and search engines to quickly identify what content is included within the page. Identifying the descriptor(s) for the document may also include analyzing document contents. Document contents may be analyzed for one or more descriptors by any of a number of techniques. For instance, the contents may be scanned for keywords based on a taxonomy, and/or the contents may be scanned to detect the placement of words (e.g., in abstract and/or topic paragraphs) and/or the statistical occurrence of words. In some implementations, text mining and data mining techniques such as natural language processing and clustering could be used. Identifying the descriptor(s) for the document may additionally include requesting a user to enter descriptors (e.g., through a visual user interface).

During or after identifying one or more descriptors for the document, processor 120 may correlate the identified document descriptor(s) with at least one document descriptor in a pre-existing taxonomy of document descriptors. Correlating the identified document descriptor(s) with the taxonomy document descriptor(s) may, for example, include comparing the identified document descriptor(s) with the document descriptor(s) in the taxonomy. If a match occurs (e.g., an exact match or one at the root word level), then a correlation may exist.

Figure 2:
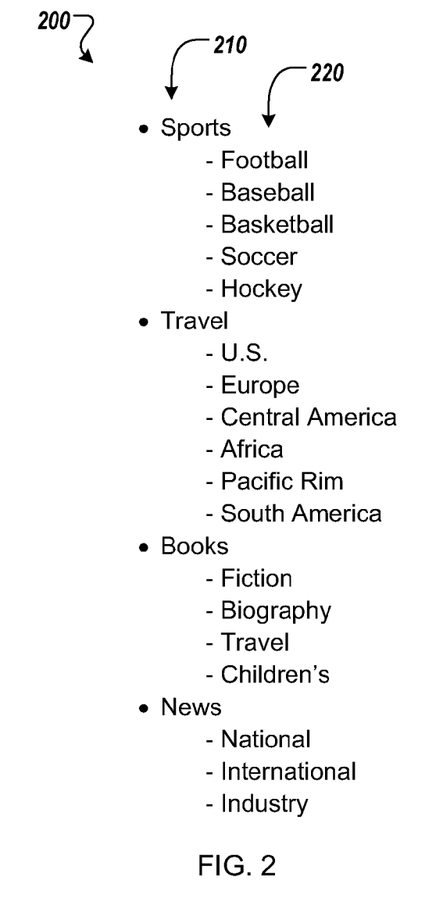
FIG. 2 is a data structure illustrating one example of a document descriptor taxonomy.

FIG. 2 illustrates one implementation of a document descriptor taxonomy 200. Taxonomy 200 is representative of a classification scheme for a user's personal data and includes top-level categories 210 (e.g., sports, travel, and books) and sub-categories 220 (e.g., football, baseball, and basketball under sports). Correlating document links with taxonomy 200 may allow a user's links to his documents of interest to be efficiently organized.

Although FIG. 2 illustrates one taxonomy for managing document links, a variety of other taxonomies exist. For example, taxonomies may vary (e.g., with fewer, more, and/or a different arrangement of categories) between types of users or from user to user. In some implementations, a user may even be able to create and/or modify a taxonomy. Additionally, a user may have one taxonomy for one purpose (e.g., work) and a different taxonomy for another purpose (e.g., leisure). The processor may determine which taxonomy to correlate the document descriptors against. The taxonomy may, for example, be based on the portal through which the system is accessing documents. Additionally, a taxonomy may have any number of levels.

Correlating the identified document descriptor(s) with the taxonomy document descriptor(s) may also include comparing the identified document descriptor(s) against a thesaurus for the taxonomy document descriptors. A thesaurus may, for example, contain synonyms, near-synonyms, and/or hierarchical relations (e.g., football is a sport) between the taxonomy document descriptors and other document descriptors. Comparing the identified document descriptor(s) against a thesaurus for the taxonomy document descriptors may be quite useful when one or more identified document descriptors does not have a direct match in the taxonomy document descriptors or when a descriptor is a subcategory in a taxonomy. Using the thesaurus, an association between the identified document descriptor(s) and the taxonomy document descriptors may be established. Note, however, that it is possible that not all identified document descriptors will have a correlation in the taxonomy document descriptors even with the use of a thesaurus.

Correlating the identified document descriptor(s) may also use the context of the document. For example, document link manager 119 may include rules to intelligently differentiate between similar words. If, for instance, a page includes the term "football," it may be unclear as to whether it refers to U.S. football or European football (soccer). The rules may, for example, automatically look at source of the document (e.g., the domain name) to determine if it is a German document (e.g., .de domain) or an U.S. document (e.g., .com domain). The document link manager may then determine which taxonomy descriptor is better suited for the document descriptor. (If ambiguities still exist, the user may be given the opportunity to select the appropriate taxonomy descriptor.) The rules may also look at other meta-data to correlate the identified descriptor(s) with the taxonomy descriptor(s).

Processor 120 also associates the correlated taxonomy document descriptor(s) with a link for the document. The document link may, for example, include a URL or other appropriate document path specifier, which may be generated or pre-existing. Associating the correlated taxonomy document descriptor with a link for the document may also include generating a visual presentation that inquires which of one or more correlated taxonomy document descriptors to associate with a document link and detecting a command indicating which correlated taxonomy document descriptors to associate with the document link. The processor may thus suggest one or more taxonomy document descriptors to associate the document link with, and a document link may be associated with one or more descriptors in a taxonomy. For example, a biographical book about a soccer player could be classified under biographies and soccer in taxonomy 200. The document link may be stored in document links 113.

In another mode of operation, processor 120 may detect a request to find a document link. Detecting a request to find a document link may, for example, be accomplished during a browse function in a word processing application or an operating system.

If a document link is to be found, processor 120 may determine one or more document descriptors associated with the document link. Determining a document descriptor associated with the document link may, for example, include identifying at least one document descriptor for a currently displayed document. Identifying a descriptor for a displayed document may, for example, include analyzing document meta-data and/or document contents. Determining a document descriptor associated with a document link may also include detecting a command that identifies at least one document descriptor. Determining a document descriptor associated with the document link may further include generating a visual representation of a document descriptor taxonomy and detecting a command indicating at least one category in the taxonomy.

Processor 120 may then find a document link based on the determined document descriptor(s). Finding a document link based on the determined document descriptor(s) may, for example, include searching an association of taxonomy document descriptors and document links based on the determined document identifier(s). Such an association may, for example, have been established using a process similar to the one describe above. The association may, for example, be based on the particular user using the system and/or the portal through which the system is accessing documents. Finding a document link based on the determine document descriptor(s) may also include mapping the determined document descriptors(s) to taxonomy document descriptors using a thesaurus.

In some implementations, the processor may have to determine how to use several determined document descriptors to find a document link. In some cases, the determined document descriptors may be prioritized. Thus, a link having taxonomy document descriptors associated with the higher priority determined document descriptors may be given preference.

In some instances, the determined document descriptor(s) may correspond to more than one document link. For example, if a determined document descriptor is football for taxonomy 200, all of the document links under football may be relevant. The processor may then present one or more document links to a user through presentation device 130 and wait for selection of the appropriate document link.

Processor 120 may also retrieve a document associated with the document link. Retrieving the document may be accomplished by any appropriate type of document retrieval (e.g., File Transfer Protocol (FTP), HyperText Transport Protocol (HTTP), or memory (e.g., disk) access).

Processor 120 may also be able to reorganize a document link collection so that the document link collection is organized according to a second document descriptor taxonomy. To accomplish this, processor 120 may, for example, determine the second document descriptor taxonomy and attempt to correlate the document descriptors of the second taxonomy with the document descriptors of the first taxonomy. The second document descriptor taxonomy may, for example, be determined based on a command regarding the document descriptor taxonomy, based on a user's current purpose for using the system, or based on how a user is currently accessing a communication network (e.g., a particular Web portal). If processor 120 cannot correlate the descriptors in the second taxonomy with the descriptors in the first taxonomy, the processor may also access a thesaurus for the second document descriptor taxonomy. The thesaurus may assist the processor with mapping the first taxonomy's document descriptors to the second taxonomy's document descriptors. If the first taxonomy's document descriptors cannot be automatically mapped, the processor may present the non-mapped descriptor(s) of the first taxonomy to a user and allow the user to specify the appropriate mapping to the second taxonomy.

Processor 120 may also map the document links from the first document descriptor taxonomy to the second document descriptor taxonomy. The mapping of the document descriptors of the first taxonomy to the second taxonomy may take place as each document link is mapped or before each document link is mapped.

Processor 120 may additionally be able to combine two or more document link collections. To accomplish this, processor 120 may, for example, use techniques similar to those just discussed for reorganizing a document link collection. Thus, one document link collection is mapped to the document descriptor taxonomy for the other document link collection and added to the other document link collection.

In the illustrated implementation, document link manager 119 is shown as a separate component from Web browser 117 and word processor 118, but in other implementations, it could be part of Web browser 117 or word processor 118. Additionally, document link manager 119 may not generally exist in system 100. For example, it may be downloaded from a remote site (e.g., a Web portal) when necessary. In these implementations, document link manager 119 may be downloaded and executed using any appropriate technology (e.g., as an ActiveX control or a Java applet).

System 100 provides a variety of features. For example, document links may be classified in at least a semi-automatic manner. This may result in a well-structured document link collection even when document links are amassed over a long time period (e.g., years), which may result in hundreds or thousands of document links, and is typically not what happens when document links are classified by users, which are generally inconsistent in classifying things. Thus, the structure imposed by system 100 may result in making document links easier to find and, hence, use. As another example, the classification of the document links may be accomplished based on the content of the documents. Thus, the categories into which the document links are placed may reflect the information content of the documents, making the document links easier to find. As a further example, document links may be retrieved in at least a semi-automatic manner, which allows for efficient and reliable lookup of document links in a collection. For instance, a document link may be looked up based on a currently displayed document. In poorly structured document link collections, finding a document link may be difficult, especially if the classification criteria cannot be recalled. As an additional example, since the classification taxonomy may vary based on the user's purpose, a classification may more readily reflect the user's current interest.

System 100 also allows a document link collection that is organized according to a taxonomy to be reorganized in an automated manner according to another taxonomy or to be combined in an automated manner with a document link collection that is organized according to another taxonomy. This may provide for the continued use of a document link collection over extended periods of time and allow a user to migrate between different platforms. Moreover, this may prove useful in distributed environments so that different document link collections may be combined or shared.

In particular implementations, taxonomies and bookmark collections may be published and shared over a network (e.g., the Internet). This could result in globally available, well-organized bookmark collections based on published classification schemas (taxonomies). These collections could be verified so that they do not contain links to content that is not relevant.

Figure 3:
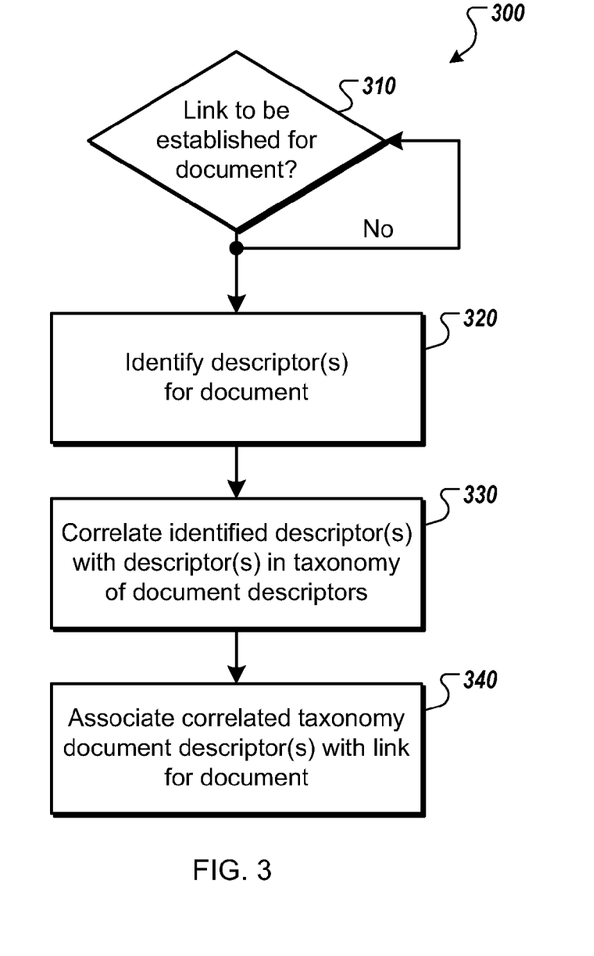
FIG. 3 is a flow chart illustrating one example of a process for managing document links.

FIG. 3 illustrates one implementation of a process 300 for managing document links. Process 300 may be one example of the operations performed by a user interface device such as system 100. Process 300 may also be representative of the operations performed by a variety of other types of user interface devices or systems.

Process 300 begins with determining that a link is to be established for a document (operation 310). Determining that a link is to be established for a document may, for example, include detecting a command indicating that a link is to be established for a document currently being visually presented. The command may be based on input from a user or derived from input from a user.

If a link is to be established for a document, process 300 calls for identifying one or more descriptors for the document (operation 320). Identifying the descriptor(s) for the document may, for example, include analyzing document metadata. Identifying the descriptor(s) for the document may also include analyzing document content. Document content may be analyzed for one or more descriptors by any of a number of techniques. Identifying the descriptor(s) for the document may additionally include requesting a user to enter descriptors (e.g., through a visual user interface).

Process 300 continues with correlating the identified document descriptor(s) with at least one document descriptor in a pre-existing taxonomy of document descriptors (operation 330). Correlating the identified document descriptor(s) with the taxonomy document descriptor(s) may, for example, include comparing the identified document descriptor(s) with the document descriptor(s) in the taxonomy. If a match occurs (e.g., an exact match or one at the root word level), then a correlation may exist. Correlating the identified document descriptor(s) with the taxonomy document descriptor(s) may also include comparing the identified document descriptor(s) against a thesaurus for the taxonomy document descriptors. This may be quite useful when one or more identified document descriptors do not have a direct match in the taxonomy document descriptors. Using a thesaurus, an association between the identified document descriptor(s) and the taxonomy document descriptors may be established.

Process 300 also calls for associating the correlated taxonomy document descriptor(s) with a link for the document (operation 340). The document link may, for example, include a URL or other appropriate document path specifier, which may be generated or pre-existing. Associating the correlated taxonomy document descriptor with a document link may, for example, include storing a pointer to the document descriptor in a table of document links. Associating the correlated taxonomy document descriptor with a link for the document may also include generating a visual presentation that inquires which of several correlated taxonomy document descriptors to associate with a document link and detecting a command indicating which correlated taxonomy document descriptors to associate with the document link.

Although FIG. 3 illustrates one implementation of a process for document link management, other processes may include fewer, additional, and/or a different arrangement of operations. For example, a process may include determining a taxonomy to correlate the document descriptors against. The taxonomy may, for example, be based on the particular user using a user interface device and/or the portal through which the user interface device is accessing documents. Thus, taxonomies may be provided as a service on a distributed network (e.g., the Internet). In some implementations, a user may even be able to create and/or modify a taxonomy. As another example, a process may include generating a document link. The link may be generated before or after being associated with the correlated taxonomy document descriptors(s). As a further example, a process may include determining which of several correlated taxonomy document descriptors to associate with a document link. In some cases, more than one taxonomy document descriptor may be associated with a document link. As an additional example, a process may include accessing the document link based on the associated document descriptors.

Figure 4:
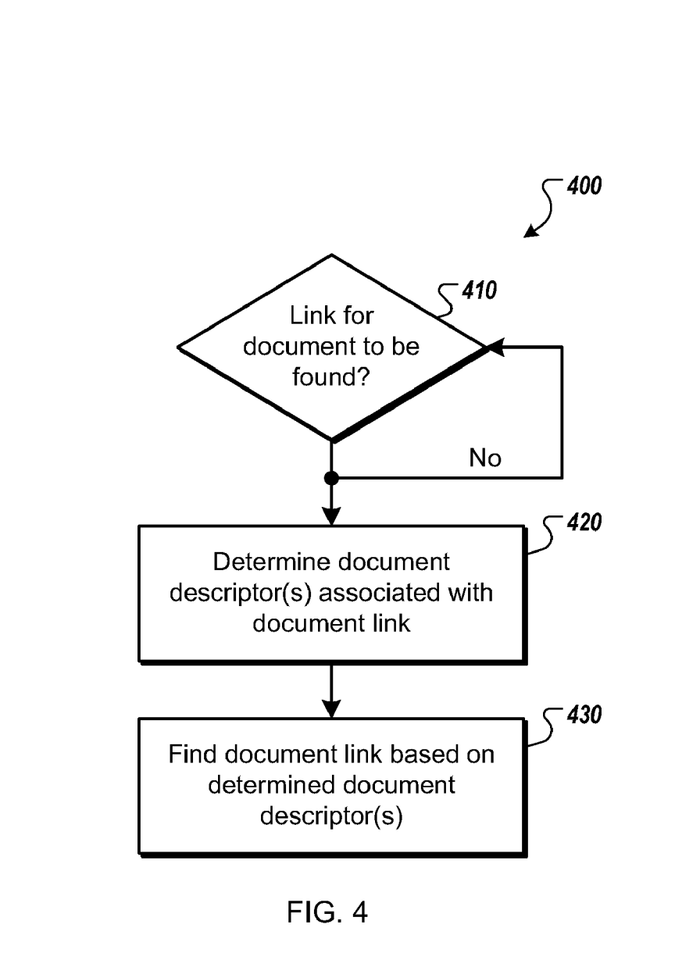
FIG. 4 is a flow chart illustrating another example of a process for managing document links.

FIG. 4 illustrates another implementation of a process 400 for managing document links. Process 400 may be one example of the operations performed by a user interface device such as system 100. Process 400 may also be representative of the operations performed by a variety of other types of user interface devices or systems.

Process 400 begins with determining that a document link is to be found (operation 410). Determining that a document link is to be found may, for example, be accomplished by detecting a command (e.g., from a user) to find a document link.

If a document link is to be found, process 400 continues with determining one or more document descriptors associated with a document link (operation 420). Determining at least one document descriptor associated with a document link may, for example, include identifying at least one document descriptor for a currently presented document. Identifying a descriptor for a document may, for example, include analyzing document meta-data and/or document contents. Determining at least one document descriptor associated with a document link may also include detecting a command that identifies at least one document identifier. Determining at least one document descriptor associated with the document link may further include generating a visual representation of the document identifier taxonomy and detecting a command regarding at least one category in the taxonomy.

Process 400 also calls for finding a document link based on the determined document descriptor(s) (operation 430). Finding a document link based on the determined document descriptor(s) may, for example, include searching an association of taxonomy document descriptors and document links based on the determined document identifier(s). Such an association may, for example, have been established using a process such as process 300. Finding a document link based on the determined document descriptor(s) may also include mapping the determined document descriptors(s) to taxonomy document descriptors using a thesaurus.

Although FIG. 4 illustrates one implementation of a process for document link management, other processes may include fewer, additional, and/or a different arrangement of operations. For example, a process may include determining a link collection to correlate the document descriptors against. The taxonomy may, for example, be based on the particular user using a user interface device and/or the portal through which the user interface device is accessing documents. As another example, a process may include retrieving a document associated with the document link (e.g., by using an FTP request). As a further example, a process may include determining how to use several determined document descriptors to find a document link. In some cases, the determined document descriptors may be prioritized. Thus, a link have taxonomy document descriptors associated with the higher priority determined document descriptors may be preferred. As an additional example, a process may include presenting one or more document links to a user and then waiting for user selection of the appropriate document link.

Figure 5:
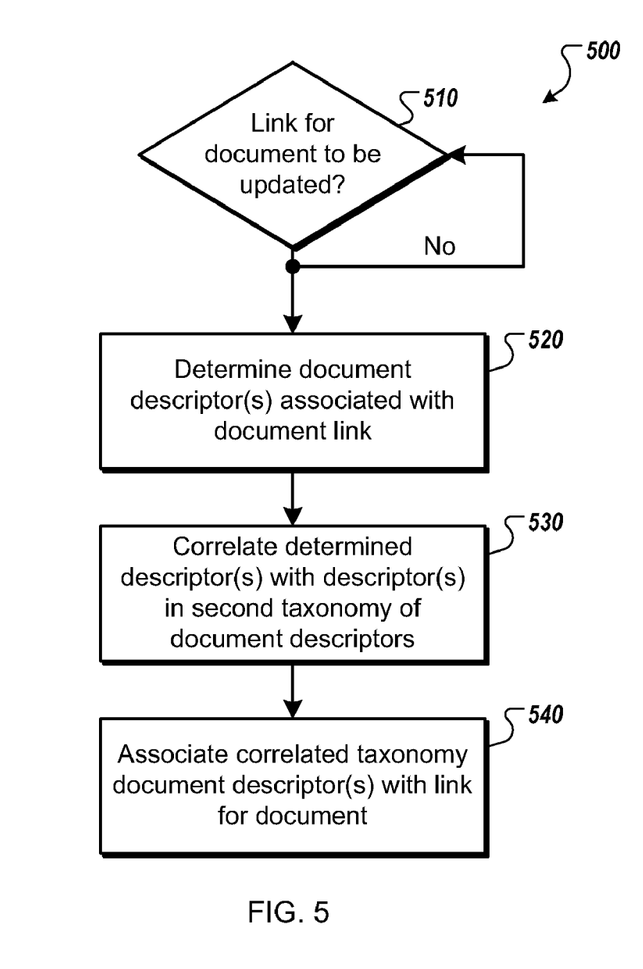
FIG. 5 is a flow chart illustrating another example of a process for managing document links.

FIG. 5 illustrates another implementation of a process 500 for managing document links. Process 500 may be one example of the operations performed by a user interface device such as system 100. Process 500 may also be representative of the operations performed by a variety of other types of user interface devices or systems.

Process 500 begins with determining whether a document link is to be updated (operation 5 10). Determining whether a document link is to be updated may, for example, be accomplished by detecting a command (e.g., from a user) indicating that a document link is to updated. A document link may need to be updated if, for example, the document link corresponds to an out of date document descriptor taxonomy or is being ported to a system that has a different document descriptor taxonomy.

If a document link is to be updated, process 500 continues with determining one or more document descriptors associated with the document link (operation 520). Determining the document descriptor(s) associated with the document link may, for example, include extracting the descriptors from the document link.

Process 500 also calls for correlating the determined document descriptor(s) with one or more document descriptors in a second taxonomy of document descriptors (operation 530). Correlating the determined document descriptor(s) with the second taxonomy document descriptor(s) may, for example, include comparing the determined document descriptor(s) with the document descriptor(s) in the second taxonomy. If a match occurs (e.g., an exact match or one at the root word level), then a correlation may exist. Correlating the determined document descriptor(s) with the second taxonomy document descriptor(s) may also include comparing the determined document descriptor(s) against a thesaurus for the second taxonomy document descriptors. This may be quite useful when one or more determined document descriptors do not have a direct match in the second taxonomy document descriptors. Using the thesaurus, an association between the determined document descriptor(s) and the second taxonomy document descriptor(s) may be established.

Process 600 additionally calls for associating the correlated second taxonomy document descriptor(s) with the document link (operation 540). Associating the correlated second taxonomy document descriptor(s) with the document link may, for example, include storing a pointer to the document descriptor in a table of document links. Associating the correlated second taxonomy document descriptor(s) with the document link may also include generating a visual presentation that inquires which of several correlated second taxonomy document descriptors to associate with the document link and detecting a command indicating which correlated second taxonomy document descriptors to associate with the document link.

Although FIG. 5 illustrates one implementation of a process for document link management, other processes may include fewer, additional, and/or a different arrangement of operations. For example, a process may include determining a second taxonomy to correlate the document descriptors against. The second taxonomy may, for example, be based on the particular user using a user interface device and/or the portal through which the user interface device is accessing documents. In some implementations, a user may even be able to create and/or modify a taxonomy. As another example, a process may include determining which of several correlated second taxonomy document descriptors to associate with a document link. In some cases, more than one taxonomy document descriptor may be associated with a document link. As an additional example, a process may include accessing the document link based on the associated document descriptors from the second taxonomy. As another example, process 500 may be repeated to convert a set of document links.

Figure 6:
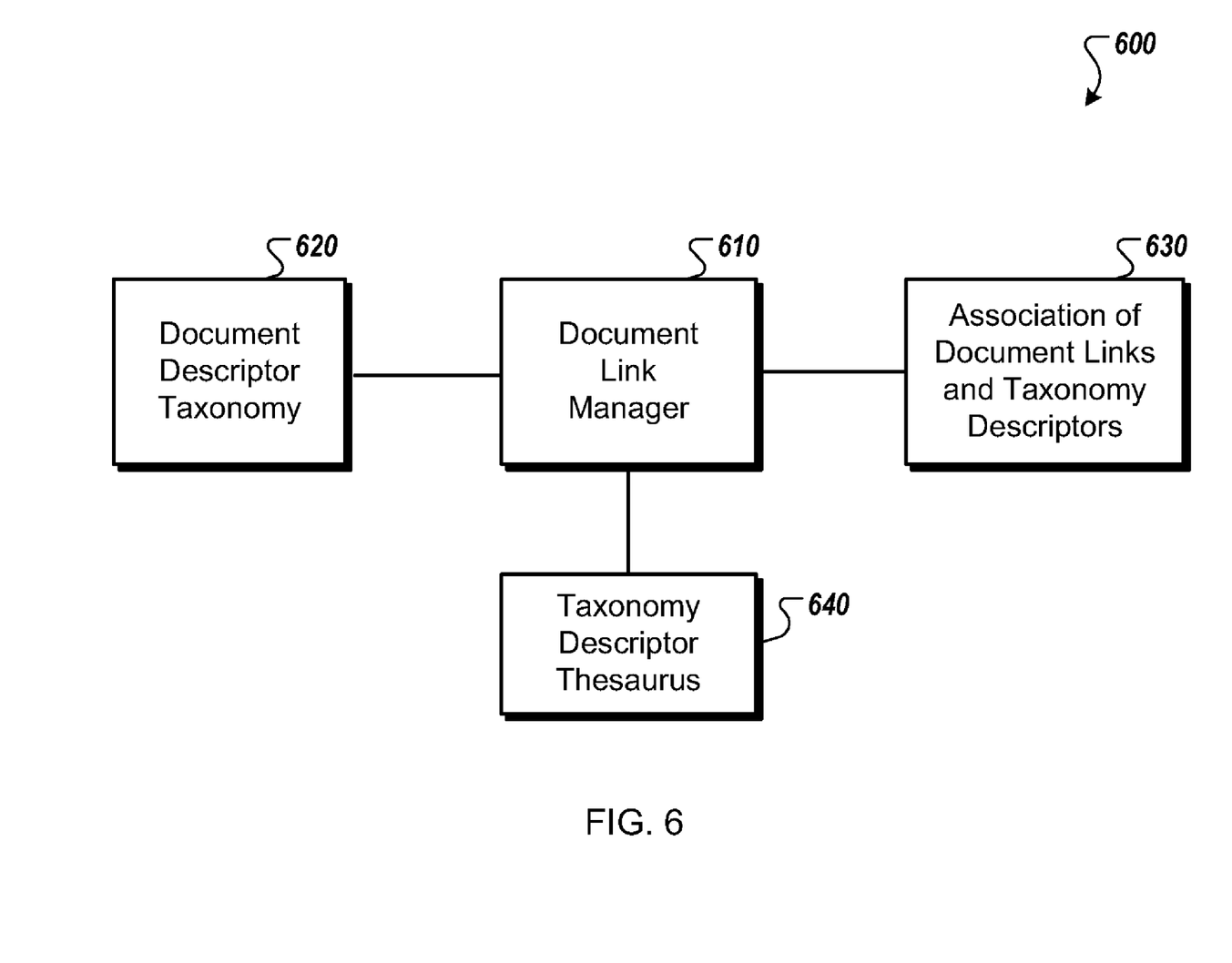
FIG. 6 is a block diagram illustrating another example of a system for managing document links.

FIG. 6 illustrates one implementation of a system 600 for managing document links. System 600 may, for example, be useful with system 100. System 600 may also be useful for a document management system or a content management system.

System 600 includes a document link manager 610, a document descriptor taxonomy 620, an association of document links and taxonomy document descriptors, and a taxonomy descriptor thesaurus 640.

When a link to a document is to be established, document link manager 610 may identify one or more descriptors for the document (e.g., by analyzing document meta-data). Document link manger 610 may then correlate the identified document descriptor(s) with at least one document descriptor in document descriptor taxonomy 620. The correlation may be made by comparing the identified document descriptors against the taxonomy document descriptors. Document link manger 610 may then associate the correlated taxonomy document descriptor(s) with a link for the document in the association of document links and taxonomy descriptors 630. The association of document links and taxonomy descriptors 630 may, for example, be a table that associates document links a taxonomy descriptors. The table may, for example, include a listing of the document links and their associated taxonomy descriptors or a listing of the taxonomy descriptors and their associated document links. The document links and/or associated document descriptors do not have to be listed in the table, as pointers or other appropriate identifiers could be used to associate document links and taxonomy descriptors. If the identified document descriptors do not appear to have a correlated taxonomy descriptor at first, document link manager 610 may use taxonomy descriptor thesaurus 640 to attempt to map the identified document descriptors to the taxonomy descriptors.

When a document link is to be found, document link manager 610 may determine at least one document descriptor associated with the document link and find the document link based on the determined document descriptor(s). Determining the document descriptor(s) associated with the document link may, for example, include identifying at least one document descriptor for a currently presented document. Finding a document link based on the determined document descriptor(s) may, for example, include searching an association of taxonomy document descriptors and document links based on the determined document identifier. If no correlated taxonomy descriptor(s) are found at first, document link manager 610 may use taxonomy descriptor thesaurus 640 to attempt to map the determined document descriptors to the taxonomy descriptors.

Although system 600 illustrates one implementation of a system for managing document links, other system for managing document links may include fewer, additional, and/or a different arrangement of components. For example, one or both of document descriptor taxonomy 620 and taxonomy descriptor thesaurus 640 may be included in document link manger 610. As another example, document link manger 610 may be a part of another component (e.g., a Web browser).

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of data communication (e.g., a wireline communication network, a wireless communication network, or an optical communication network). Examples of communication networks include a local area network ("LAN"), a wide area network ("WAN"), and the Internet.

The computing system can include clients and servers. A client and server are generally positioned apart from each other and typically interact through a communication network. The relationship of client and server arises by virtue of computer programs running on the respective computers and having a client-server relationship to each other.

Although only a few implementations have been described in detail above, other implementations are possible. Portions of this disclosure discuss managing document links by providing automated techniques for organizing and retrieving the links. This may be implemented by one or more of the systems and/or techniques disclosed, or other applicable systems and techniques. Other portions discuss managing document links by reorganizing and combining by automated techniques. This also may be implemented by one or more of the described systems and/or techniques, or other applicable systems and techniques. Also, the logic flows depicted in FIGS. 3 and 4 do not require the particular order shown, or sequential order, to achieve desirable results. In certain implementations, moreover, multitasking and parallel processing may be preferable.

Other implementations may be within the scope of the following claims.

The invention claimed is:

1. An automated method performed by at least one processor for managing links to documents, the method comprising:
   determining that a link is to be established for a document;
   analyzing the document to identify at least one descriptor for the document;
   correlating the identified document descriptor with at least one document descriptor in a pre-existing taxonomy of document descriptors;
   generating the link for the document, the link stored in memory as a bookmark in a collection of bookmarks of a particular user;
   associating the correlated taxonomy document descriptor with the link for the document; and
   storing a pointer to the correlated taxonomy document descriptor with the link for the document in the collection of bookmarks based on the association of the identified document descriptor and the correlated taxonomy document descriptor.

2. The method of claim 1, wherein determining that a link is to be established for a document comprises detecting a command indicating that a link is to be established for a document currently being visually presented.

3. The method of claim 1, wherein identifying at least one descriptor for the document comprises analyzing document meta-data.

4. The method of claim 1, wherein identifying at least one descriptor for the document comprises analyzing document contents.

5. The method of claim 1, wherein correlating the identified document descriptor with at least one document descriptor in a pre-existing document descriptor taxonomy comprises comparing the identified document descriptor with the document descriptors in the taxonomy.

6. The method of claim 1, further comprising reorganizing a set of document links organized according to the document descriptor taxonomy so that the document links are organized according to a second document descriptor taxonomy.

7. The method of claim 1, wherein correlating the identified document descriptor with at least one document descriptor in a pre-existing document descriptor taxonomy comprises comparing the identified document descriptor against a thesaurus for the taxonomy document descriptors.

8. The method of claim 1, wherein associating the correlated taxonomy document descriptor with a link for the document comprises:
   generating a visual presentation that inquires which of several correlated taxonomy document descriptors to associate with a document link; and
   detecting a command indicating which correlated taxonomy document descriptors to associate with the document link.

9. The method of claim 1, wherein a document link comprises a Uniform Resource Locator.

10. The method of claim 1, further comprising:
    determining that a document link is to be found;
    determining at least one document descriptor associated with a document link; and
    finding a document link based on the determined document descriptor.

11. The method of claim 10, wherein determining at least one document descriptor associated with a document link comprises identifying at least one document descriptor for a currently presented document.

12. The method of claim 10, wherein determining at least one document descriptor associated with a document link comprises detecting a command that identifies at least one document descriptor.

13. The method of claim 10, wherein determining at least one document descriptor associated with the document link comprises:
    generating a visual representation of the document descriptor taxonomy; and
    detecting a command regarding at least one category in the taxonomy.

14. The method of claim 10, wherein finding a document link based on the determined document descriptor comprises searching an association of taxonomy document descriptors and document links based on the determined document descriptor.

15. A system for managing document links, the system comprising:
    a memory, the memory adapted to store instructions and data regarding document links; and
    a processor coupled to the memory, the processor operable, according to the instructions, to:
      determine that a link is to be established for a document;
      analyze the document to identify at least one descriptor for the document;
      correlate the identified document descriptor with at least one document descriptor in a pre-existing taxonomy of document descriptors;
      generate the link for the document, the link stored as a bookmark in a collection of bookmarks of a particular user;
      associate the correlated taxonomy document descriptor with the link for the document; and
      store a pointer to the correlated taxonomy document descriptor with the link for the document in the collection of bookmarks based on the association of the identified document descriptor and the correlated taxonomy document descriptor.

16. The system of claim 15, wherein the processor is operable to compare the identified document descriptor against a thesaurus for the taxonomy document descriptors to correlate the identified document descriptor with at least one document descriptor in a pre-existing document descriptor taxonomy.

17. The system of claim 15, wherein the processor is, according to the instructions, further operable to reorganize a set of document links organized according to the document link taxonomy so that the document links are organized according to a second document link taxonomy.

18. The system of claim 15, wherein the processor is, according to the instructions, further operable to:
    detect a command to find a document link;
    determine at least one document descriptor associated with a document link; and
    find a document link based on the determined document descriptor.

19. An article of manufacture comprising a machine-readable medium storing instructions operable when executed by a processor to cause one or more machines to:
    determine that a link is to be established for a document;
    analyze the document to identify at least one descriptor for the document;
    correlate the identified document descriptor with at least one document descriptor in a pre-existing taxonomy of document descriptors;
    generate the link for the document, the link stored as a bookmark in a collection of bookmarks of a particular user;
    associate the correlated taxonomy document descriptor with the link for the document; and
    store a pointer to the correlated taxonomy document descriptor with the link for the document in the collection of bookmarks based on the association of the identified document descriptor and the correlated taxonomy document descriptor.

20. The article of manufacture of claim 19, wherein the instructions are operable to compare the identified document descriptor against a thesaurus for the taxonomy document descriptors to correlate the identified document descriptor with at least one document descriptor in a pre-existing document descriptor taxonomy.

21. The article of manufacture of claim 19, wherein the instructions are further operable to cause one or more machines to reorganize a set of document links organized according to the document link taxonomy so that the document links are organized according to a second document link taxonomy.

22. The article of manufacture of claim 19, wherein the instructions are further operable to cause one or more machines to:
    detect a command to find a document link;
    determine at least one document descriptor associated with a document link; and
    find a document link based on the determined document descriptor.

* * * * *